April 7, 1970 — E. PLUMAT — 3,505,048
PROCESS AND APPARATUS FOR ELECTROCHEMICAL MODIFICATION OF GLASS
Filed May 4, 1966 — 4 Sheets-Sheet 1
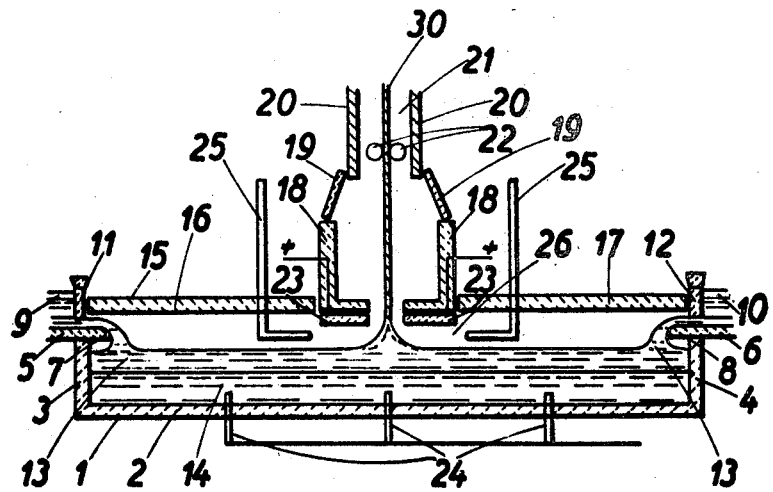
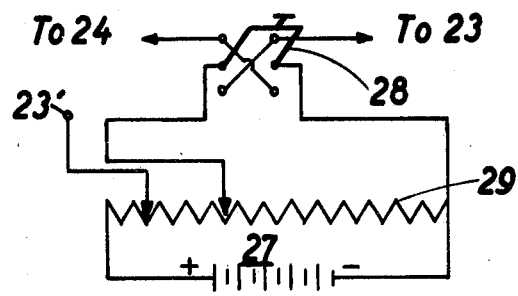
Inventor:
Emile Plumat
By: Spencer & Kaye
Attorneys United States Patent Office 3,505,048
Patented Apr. 7, 1970

3,505,048
PROCESS AND APPARATUS FOR ELECTRO-
CHEMICAL MODIFICATION OF GLASS
Emile Plumat, Gilly, Belgium, assignor to
Glaverbel S.A., Brussels, Belgium
Continuation-in-part of application Ser. No. 286,302,
June 7, 1963. This application May 4, 1966, Ser.
No. 547,518
Claims priority, application Luxembourg, May 6, 1965,
48,531
The portion of the term of the patent subsequent
to July 23, 1985, has been disclaimed
Int. Cl. C03c 21/00; C03b 18/00
U.S. Cl. 65—30                          12 Claims

ABSTRACT OF THE DISCLOSURE

A process and associated apparatus for electrochemical modification of glass which includes floating one side of a liquid layer of glass on a higher density, molten ion source with a gaseous atmosphere ion source contacting the opposite surface of the glass, and providing an electric field with variable polarity between the molten and gaseous materials so as to effect controlled diffusion of ions in, into, out of or away from the glass, with apparatus including a sheet glass drawing unit, a molten material vessel, gaseous atmosphere discharge element and electrodes.

---

This application is a continuation-in-part of my copending application Ser. No. 286,302, filed June 7, 1963, now abandoned.

The present invention relates to the field of glass manufacture, and particularly to a method for producing a controlled modification of the composition of at least a portion of a layer of glass while it is in the liquid state prior to being formed into a solid sheet.

It is well known that the composition of glass in the liquid state can be modified by causing an ion exchange to take place between the molten glass and a hot gas containing ions of a suitable type. This phenomenon can be employed for modifying the composition of molten glass at the surface of a molten glass bath feeding a glass-forming apparatus. For example, if alkali metal ions are introduced into the atmosphere which is in contact with the molten glass, diffusion of such ions into the molten glass takes place at the surface thereof.

However, it has not heretofore been possible to effect a sufficient control to achieve any degree of consistency in the composition of the resulting sheet glass. In fact, experience has shown that the properties of the resulting glass sheet made from molten glass treated in this manner often differ substantially from those desired.

It is also known that the ion exchanges affecting the properties of the glass take place when molten glass is placed in contact with molten metal or a molten metallic salt. This occurs, for example, in processes for manufacturing float glass. It often occurs in such processes, and in particular when molten glass is floated on a molten metallic salt, that the ion exchange is so intense as to seriously damage the glass. In order to prevent such damage from occurring, it has already been suggested to control the ion exchange by passing a controlled electric current through the molten glass and the molten metallic salt. However, such a control would require that the molten glass be completely surrounded by the molten metal or metallic salt and serious difficulties and complications are encountered in attempting to provide such an arrangement.

It is a primary object of the present invention to eliminate these drawbacks and difficulties.

A more specific object of the present invention is to provide a novel method for controlling ion exchanges carried out in the manufacture of glass.

Another object of the present invention is to permit such ion exchanges to be controlled in a simple manner and with great accuracy.

These and other objects according to the present invention are achieved by means of a process for treating glass in the liquid, i.e., molten or plastic, state, which process includes the steps of feeding a layer of such glass to a sheet forming area by floating the layer on a molten mass of a material having a higher density than the layer, maintaining a gaseous atmosphere in contact with the glass, and providing an electric field which extends between the atmosphere and the molten mass.

The present invention also involves apparatus for carrying out the above process. This apparatus essentially includes a sheet glass forming unit, and a vessel for holding a bath of molten material and a layer of glass in the liquid state floating on such bath. The material constituting the bath is chosen to have a higher density than the glass. The vessel is also arranged for maintaining a gaseous atmosphere in contact with such glass layer. The apparatus further includes means for maintaining the glass layer in movement toward the forming unit and means for maintaining an electric field between the bath and the atmosphere maintained in contact with the glass layer.

The particular effect which the electric field will have on the layer of liquid glass will depend, in any given case, on the direction and intensity of the field and on the composition of the molten mass and/or the atmosphere with respect to that of the liquid glass. An appropriate choice of these factors will permit any one of a wide variety of modifications to be imparted to the glass.

Additional objects and advantages of the present invention will become apparent upon consideration of the following description when taken in conjunction with the accompanying drawings in which:

FIGURE 1 is an elevational, cross-sectional view of a first embodiment according to the present invention.

FIGURE 2 is a schematic diagram of a voltage source to be used with the arrangement of FIGURE 1.

Figure 3:
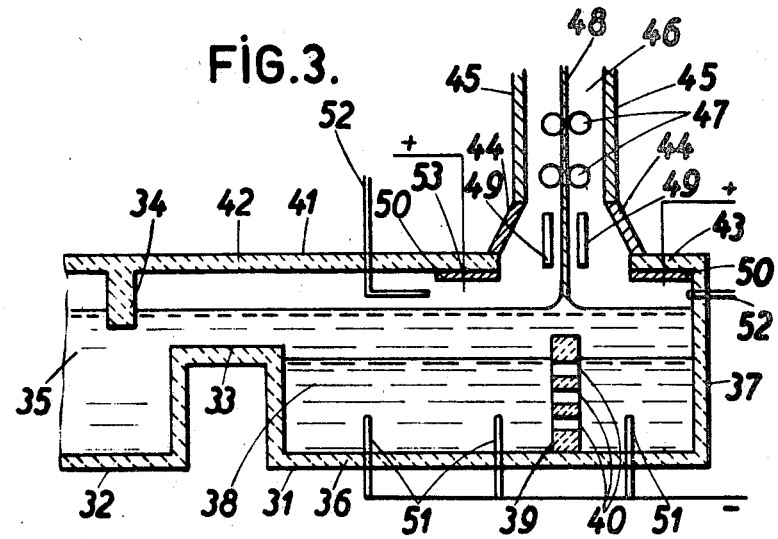
FIGURE 3 is a view similar to that of FIGURE 1 of another embodiment according to the present invention.

Referring first to FIGURE 1, there is shown a vessel, or tank 1 having a sole 2 and two side walls 3 and 4.

The vessel contains a bath 14 of a molten metal or metallic salt, such as a tin salt for example. Molten glass from a glass melting tank furnace flows into tank 1 through two rectangular passages. One rectangular passage is defined by the bottom wall 5, the side walls 9 (these side walls extending parallel to the plane of the figure so that only the rear side wall is visible), and a vertically adjustable barrier 11 of one tank furnace, or of a portion of a tank furnace. The bottom wall 5 extends into tank 1 to form a ledge 7 over which molten glass flows after having passed through the rectangular passage. The other rectangular passage is similarly defined by the bottom wall 6, the side walls 10, and the vertically adjustable barrier 12 of another tank furnace, or a portion of a tank furnace. Bottom wall 6 also extends into tank 1 to form a flow ledge 8. The heights of barriers 11 and 12 can be varied in order to control the flow rate of the molten glass 13.

The glass flowing through these passages spreads out on top of the bath 14 of molten salt, this bath having a higher density than the liquid glass.

Above tank 1 is disposed a cover structure 15 constituted by lid members 16 and 17. Above tank 1 there are also provided L-shaped shields 18 which together define an opening through which glass is drawn upwardly from the tank 1 in to drawing tower 21 having walls 20. The lower ends of walls 20 are connected to the shields 18 by inclined walls 19.

Within the tower 21 are disposed a series of pairs of forming rollers 22, only the lower pair of which is shown in the drawing.

Within the tank 1 is disposed a pair of upper electrodes 23 each of which is attached to the horizontal leg of a respective one of the shields 18. There are also provided three lower electrodes 24 which extend through sole 2 and into bath 14. Tank 1 is further provided with tubes, or pipes, 25 each of which passes through a respective one of the lid members 16 and 17 and has an outlet which opens into a space 26 provided between electrodes 23 and the surface of the glass layer 13. These pipes 25 are provided for conveying an ionized material and for discharging it into the region traversed by the electric field extending between electrodes 23 and 24.

Electrodes 23 and 24 are connected to a D.C. voltage source which applies a potential difference between them.

One form which the voltage source may take is shown schematically in FIGURE 2 to include a battery, or other D.C. power supply, 27 connected across a potentiometer 29, and a polarity reversing switch 28 having one terminal connected to the slider of potentiometer 29 and the other terminal connected to an end terminal of the potentiometer. One output terminal of switch 28 is connected to electrodes 24 while the other output terminal thereof is connected to one or both electrodes 23. If the other output terminal of switch 28 is connected to only one of the electrodes 23, the other electrode 23 can be connected to a second, independently movable tap of potentiometer 29 by way of terminal 23'. This permits the electrodes 23 to be at two different potentials and thus permits different field strengths to be created at different regions across the liquid glass layer. Such an arrangement will produce advantageous results in certain cases.

Operation of switch 28 permits a selection of the polarity of the electrodes with respect to each other, while control of the movable taps of potentiometer 29 permits a control of the voltage between the electrodes to be effected. An arrangement of the type shown in FIGURE 2 may be employed with each of the embodiments shown in the drawings.

Referring again to the arrangement of FIGURE 1, if the atmosphere in space 26 contains free ions, such ions can be made to diffuse into the glass layer 13. Whether, and to what extent, such diffusion will take place will depend, in each case, on the mobility of the ions, the strength of the electric field, and the electrical value of the diffusion barrier constituted by the glass-atmosphere interface. When the conditions are such that a diffusion can take place, the rate of this diffusion can be controlled by merely giving the electric field strength a proper value.

If ions are to be diffused into the glass layer 13 from the atmosphere, the required concentration of such ions in the atmosphere may be maintained by continuously or intermittently discharging such ions into the atmosphere in the vicinity of the electric field by means of tubes 25. This procedure permits the nature of the ionized material to be rapidly changed when required. If desired, ions of different types of materials may be simultaneously introduced into the atmosphere through different tubes for diffusion into the glass. In such cases, the concentration of each separate type of ion may be independently controlled.

Depending on the composition of the glass and of the molten bath, such a diffusion of ions from the atmosphere into the glass may be accompanied by a diffusion of ions from the glass into the molten bath. For example, metal ions contained in the glass may be caused to diffuse into the molten bath in situations where the glass originally contains metal ions which are more electropositive than the metal constituting the molten bath. Such a diffusion of ions from the molten glass into the bath can, in certain cases, produce beneficial results. For example, in one process according to the present invention, alkali metal ions can be made to diffuse from the glass layer into the molten bath and, after neutralization therein, to combine with impurities such as sulphur or oxygen, thereby rendering these ions less injurious to the glass than would be the case if they were to combine with one or more of the metals constituting the molten bath. It should be appreciated, however, that this is only an example of an auxiliary effect which may be produced by processes according to the present invention. Various comparable results may be produced in other processes according to the present invention, the particular result produced depending upon the composition of the materials involved and being subsidiary to the main object of modifying the composition of the glass.

It should also be appreciated that an appropriate selection of the polarity and strength of the electric field and of the composition of the molten bath with respect to that of the glass will permit the occurrence of a controlled diffusion of selected ions from the molten bath into the glass layer.

In the performance of one process according to the present invention, the glass layer is drawn upward into the drawing tower 21 to form a glass sheet 30 while an electric potential is maintained between the electrodes 23 and 24 such that the electrodes 23 are positive with respect to the electrodes 24. Because of this potential difference existing between the electrodes 23 and 24, the molten bath 14 which is here constituted by tin, the liquid glass layer 13, and the atmosphere in space 26 form an electrochemical system in which positive ions move in a downward direction.

In this electrochemical system, different phenomena occur at each of the surfaces of the glass layer. At the tin glass interface, sodium ions originally contained in the glass layer move downward into the tin bath and become neutralized. The polarity of the electric field nullifies any tendency of the tin ions contained in the bath to migrate into the glass layer, so that any "bloom" which may otherwise result is completely avoided. At the glass atmosphere interface, sodium ions originally contained in the glass layed are displaced in a downward direction and are replaced by ions of a different type which diffuse into the glass from the atmosphere existing in space 26.

In one specific exemplary process according to the present invention, the glass layer 13 was constituted by a soda-lime glass and ionized lithium chloride was introduced into the atmosphere existing in space 26 by means of tubes 25, the lithium chloride thus being introduced into the region traversed by the electric field between electrodes 23 and 24. The current flow in milliamperes between the electrodes was measured for various temperatures of the liquid glass layer 13 and for various voltages between the electrodes. The distance between the two upper electrodes 23 and the bath of molten tin in which the three lower electrodes 24 were dipped was about 25 mm.

Figure 7:
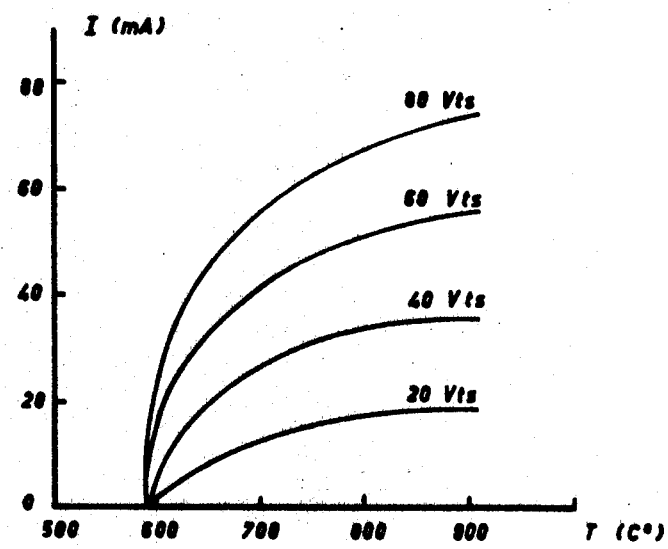
FIGURE 7 is a graph used in explaining the operation of arrangements according to the present invention.

The results of these measurements are shown in the form of curves in the graph of FIGURE 7. Each of the curves shown in FIGURE 7 represents the variation in current between the electrodes as a function of the temperature of the liquid glass layer for a particular potential difference between the electrodes. These curves represent the values obtained for voltage differences of 20 volts, 40 volts, 60 volts, and 80 volts, respectively. In each case, the amplitude of the current constitutes a measure of the rate of diffusion of lithium ions from the space 26 into the glass layer. It may be noted that for any given glass temperature, the magnitude of the current varies in proportion with that of the applied voltage. In the arrangement of FIGURE 1 lithium ions are introduced on both sides of the meniscus formed by the vertical drawing of the glass. The electric field between electrodes 23 and 24 also extends on both sides of this meniscus and is of uniform intensity because both electrodes 23 are at the same potential. Therefore, lithium ions are caused to replace sodium ions in both surface layers of the resulting drawn sheet 30.

Tests performed on glass sheets drawn from a layer of liquid glass which was subjected to the above treatment showed that the effect of the diffusion of lithium ions into both surface layers of the sheet caused compressive forces to be set up in the glass due to differential contraction during cooling. As a result, the mechanical strength of the glass was improved in a manner analogous to that produced by conventional tempering treatment. Thus, one process according to the present invention can be considered to constitute a sort of chemical tempering which has the advantage over prior art tempering techniques that it results from a process carried out during the formation of the sheet glass rather than subsequent to the formation thereof.

Another advantage resulting from this chemical tempering process is that it can be employed even in the manufacture of thin sheet glass having a thickness of less than 6 mm., 6 mm. being the minimum thickness of sheet glass which can be tempered by conventional techniques.

By way of comparison, sheet glass having a thickness of about 6 mm. has been found to exhibit compressive forces of the order of 8 kg./mm.$^2$ when tempered by conventional techniques. In experimental tests performed on sheet glass fabricated in an arrangement of the type shown in FIGURE 1, it was found that the diffusion of lithium ions into soda-lime glass during the manufacture of glass sheets having a thickness of 6 mm. caused the sheets to exhibit compressive forces of the order of 5.8 kg./mm.$^2$. In further tests performed on glass which, in the liquid state, was exposed to ionized magnesium salt rather than lithium salt, the glass exhibited compressive forces of the order of 7.8 kg./mm.$^2$.

It may thus be seen that the diffusion of ions into the liquid glass results in a modification in the composition of at least one surface layer thereof. It has been found that the composition of the atmosphere and/or the molten bath 14 may be chosen in such a way as to permit any one of a wide variety of modifications to be imparted to the glass. Such processes permit certain chemical properties of the glass to be modified, as well as certain mechanical and optical properties thereof.

For example, the resistance of the glass to corrosion by atmospheric or chemical agents may be appreciably improved by enriching a surface layer thereof with calcium or magnesium. Moreover, certain optical properties, such as the luster, of the resulting glass products may be improved by diffusing lead, tin, or barium into the liquid glass. As another example, at least part of the glass may be tinted by diffusing into it ions of one of the following metals: iron, manganese, nickel, cobalt, copper and selenium. In addition, the coefficient of thermal expansion of the resulting glass sheet can be appreciably modified by replacing at least some of the sodium ions originally present in the glass by ions of elements such as lithium or potassium.

Other processes may be carried out according to the present invention in which no diffusion of ions takes place either from the molten bath 14 or from the atmosphere present in space 26. These other processes rely on the fact that an electric field traversing the layer of liquid glass causes ions originally present in this layer to migrate from one surface region to the other surface region thereof. Such a migration, which takes place wholly within the liquid glass layer, will often have the effect of modifying the composition of at least one surface region of the glass layer in a beneficial manner. For example, by forcing alkali metal ions to migrate toward the interior of the glass layer, the outer surface region of the resulting glass sheet will be made less rich in these ions and will thus have a better resistance to the action of weathering agents.

It should also be noted that it is not necessary, in accordance with the present invention, to produce a migration of ions within the glass layer and/or diffusion of ions into the layer, across the entire surface area of the layer. In fact, it has been found that it is often advantageous to localize the electric field so as to cause it to influence only one or more selected zones across the area of the glass layer, thereby confining the modifications imparted to the glass to such zone or zones.

It should also be noted that while the present invention is primarily concerned with the treatment of glass which is to be subsequently formed into flat sheets by drawing, it can be used equally well in conjunction with processes for producing glass sheets by rolling, such techniques being used in the production of patterned glass, for example.

While it may be noted that the upper electrodes 23 of FIGURE 1 are both at the same potential and at the same level, as are the lower electrodes 24, it is also possible, according to the present invention, to produce different electric field strengths in different regions across the liquid glass layer 13 by providing a plurality of upper electrodes and/or a plurality of lower electrodes and by maintaining different ones of the upper electrodes and/or different ones of the lower electrodes at different potentials, as described above in connection with FIGURE 2, or at different levels in the tank 1. In addition, instead of constituting the electrodes by separate structural elements, it is possible to make at least one part of the vessel itself of an electrically conductive material and to connect that part as one of the electrodes. For example, the sole 2 of the vessel could be made of a conductive material and could be made to serve as the lower electrode.

Another arrangement according to the present invention is shown in FIGURE 3 in the form of apparatus for the drawing of glass in accordance with the Pittsburgh process. A body 35 of molten glass flows from the refining end 32 of a furnace tank into a treating vessel 31. The molten glass flows below a barrier 34 which projects downwardly into the upper layers of the molten glass and over a sill 33. The layer of molten glass in tank 31 floats on a bath 38 of a molten material having a higher density than the molten glass. The tank 31 is constituted by sole 36, sill 33, and an end wall 37. The upper level of the bath 38 extends below the level of sill 33 so that the material constituting this batch can not pass into the refining end 32 of the furnace tank.

Within the tank 31, a vertical rib 39 extends upwardly from the sole 36, completely through the bath 38, and partially into the layer of molten glass. The molten glass moves from the refining end 32 of the furnace tank to the drawing zone disposed directly below drawing tower 46. The vertical rib 39 serves to maintain the meniscus formed when the glass is drawn into a sheet 48 at a predetermined location directly below the drawing tower 46. Rib 39 is provided with holes 40 through which the molten material of bath 38 can flow.

The apparatus further includes a cover arrangement 41 which includes lid members 42 and 43 and inclined walls 44, the latter being connected with the vertical walls 45 of the glass drawing tower 46.

Within tower 46 is disposed a succession of pairs of forming rollers 47, only the lowermost pairs of these rollers being shown.

The glass sheet 48 drawn from the body 35 of molten glass first passes between coolers 49 before being drawn between the forming rollers 47.

Within the tank 41 there are disposed two upper electrodes 50 attached to the lower surfaces of cover members 42 and 43, respectively. There are also provided three lower electrodes 51 which are electrically connected together in parallel and which extend through the sole 36 of tank 31 and into the bath 38. Finally, one tube 52 passes through lid member 42 and another tube 52 passes through end wall 37. Each of these tubes 52 has an outlet end which opens into the space 53 extending between the upper electrodes 50 and the upper surface of the molten glass. These tubes which are made of a refractory material, are provided for conveying ionized materials and for discharging these materials into the space 53 where they are subjected to the action of an electric field produced when the electrodes 50 and 51 are connected to a D.C. voltage source of the type illustrated in FIGURE 2.

The molten glass layer from which the sheet 48 is drawn may be subjected to any one of the ion diffusion and migration treatments described above.

Figure 4:
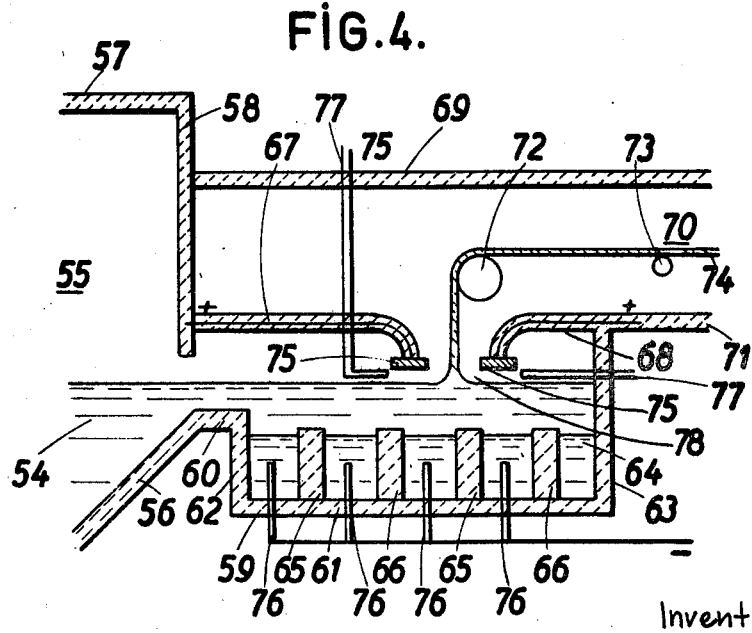
FIGURE 4 is another view similar to FIGURE 1 of a further embodiment according to the present invention.

Referring now to FIGURE 4, there is shown apparatus for drawing sheet glass in accordance with the Libby-Owens process. The molten glass 54 is delivered into a treatment tank 59, which has the form of a conventional drawing pot, from the refining end 55 of a furnace tank. This refining end is constituted by a sloping sole member 56, a lid member 57, and an upper end wall 58. A sill 60 is formed between refining end 55 and the tank 59. The drawing pot constituted by tank 59 includes a sole 61 and end walls 62 and 63. Tank 59 holds a bath 64 of a molten material which is denser than the glass 54, the surface of such bath being disposed below the level of sill 60.

The molten glass 54 flowing over the sill 60 spreads out on top of bath 64 and moves toward the drawing zone. Baffles 65 and 66 extend upwardly from sole 61, through bath 64, and into the layer of molten glass 54. These baffles are provided for promoting an effective heat exchange betwen the molten glass 54 and the bath 64.

In this arrangement, it is not necessary to provide a vertical rib for stabilizing the position of the drawing meniscus since the molten glass layer within tank 59 is relatively thin.

Disposed above tank 59 are two lower lid members 67 and 68 the inner ends of which curve downwardly toward the molten glass layer 54. Above these lower lid walls is disposed an annealing lehr 70 defined by an upper wall 69 and a lower wall 71 which forms an extension of the lower lid member 68. The glass drawn upwardly from the surface of the molten glass layer passes over a bending roller 72 and is conveyed, in the form of a horizontal sheet 74, along the lehr 70 by means of a series of conveying rollers 73 only one of which is visible in the drawing.

Two upper electrodes 75 are each attached to the inner end of a respective one of the lid members 67 and 68, and four lower electrodes 76 extend through sole 61 and into the molten bath 64. These electrodes are arranged with connecting leads for connection to a voltage source of the type shown in FIGURE 2.

There are also provided tubes 77 one of which extends through wall 69 and lid member 67 and the other one of which extends through end wall 63, each of these tubes having an outlet which opens into the space 78 between upper electrodes 75 and the surface of the layer of molten glass 54.

The glass treating arrangement in this embodiment is also capable of subjecting the glass to the same treatments as those described above.

Figure 5:
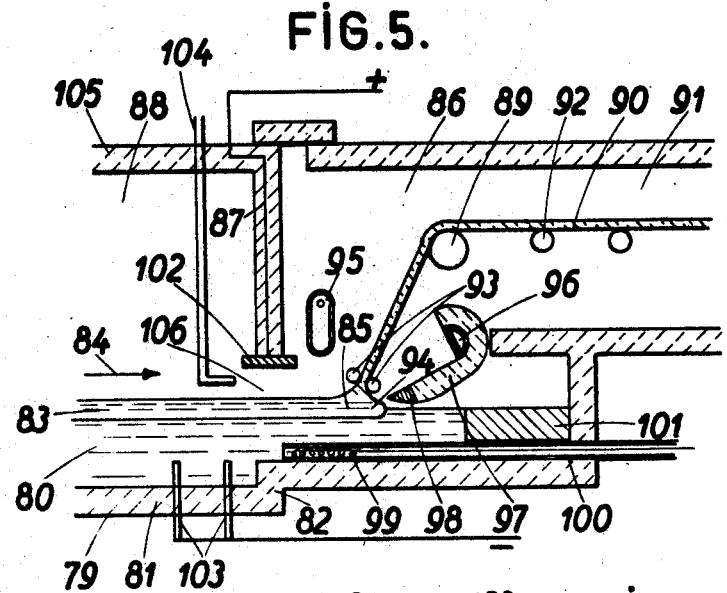
FIGURE 5 is a view similar to that of FIGURE 1 of still another embodiment according to the present invention.

Referring now to FIGURE 5, there is shown a glass processing apparatus which includes a tank 79 holding a bath 80 of a molten material which is denser than the layer of molten glass 83 floating thereon. The tank 79 includes a sole 81 which is separated into two levels by a step 82. Above the right-hand side, or upper level, of the sole 81 is disposed the glass drawing zone in which the molten glass 83, which floats on the bath 80 and which moves in the direction of arrow 84, is drawn upwardly from the region 85, 94, into a compartment 86. Compartment 86 is separated by a partition wall 87 from the region 88 of tank 79. This partition wall 87 extends downward to a point near the surface of glass layer 83 in order to reduce the intensity of the air currents generated in the drawing compartment 86.

Disposed within the compartment 86 is a drawing roller 89 which simultaneously serves as a bending roller. The glass sheet 90, after bending around the roller 89, is carried by rollers 92 through an annealing lehr 91. Also within compartment 86 there are provided small marginal rollers 93 positioned slightly above the region 85, 94. These rollers serve to prevent the drawn glass strip 90 from shrinking excessively while it is being formed.

The glass strip 90 is cooled on both sides in the region 85, 94 by the coolers 95 and 96. The cooler 96 is arranged to cool the molten glass by a sufficient amount to prevent it from flowing beyond the region 94. In order to prevent the cooler 96 from causing the solidification of the portion of bath 80 in the vicinity of region 94, there is provided a thermal shield 97 which extends between the cooler 96 and the bath 80. The lower end portion 98 of shield 97 is made of boron nitride in order to prevent the molten glass 83 from adhering to the shield in the event that the glass in region 94 is insufficiently cooled and is thus permitted to move into contact with the shield.

Electric resistance heaters 99 are disposed in ducts 100 which are immersed in bath 80. Heaters 99 are arranged to produce sufficient heat to prevent the bath 80 from solidifying in the region below the region 94 of glass layer 83. Only that bath portion 101, which is situated at the extreme right-hand end of the tank, is permitted to solidify.

In order to permit the glass layer 83 to be subjected to the ion diffusion and/or migration treatments according to the present invention, there are provided an upper electrode 102, which is attached to the lower end of partition wall 87, and two lower electrodes 103 which extend through sole 81 and into bath 80. There is also provided a tube 104 which passes through the lid member 105 extending to the left of partition wall 87. Tube 104 has an outlet which opens into the space 106 extending between electrode 102 and the surface of glass layer 83. Tube 104 is provided for conveying ionized materials and for discharging these materials into the space 106, where they will be subjected to the action of the electric field extending between electrodes 102 and 103 when these electrodes are connected to a suitable voltage source, such as the type shown in FIGURE 2, for example.

Here again, the glass layer 83 may be subjected to all of the diffusion and/or migration processes described above.

Figure 6:
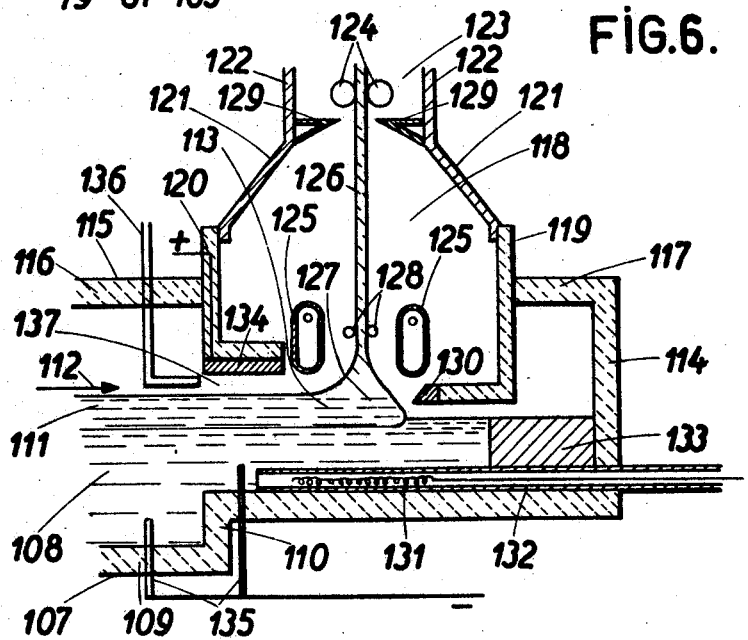
FIGURE 6 is a view similar to that of FIGURE 1 of a still further embodiment according to the present invention.

Referring now to FIGURE 6, there is shown an arrangement which is similar to that shown in FIGURE 5. The arrangement of FIGURE 6 includes a tank 107 having a stepped sole 109, and end wall 114, and a cover 115 constituted by lid members 116 and 117. Tank 107 holds a bath 108 of a molten material having a higher density than the molten glass 111 floating thereon. The glass forming the layer 111 moves in the direction of the arrow 112 to a region 113 disposed above the upper level of sole 109, this upper level being disposed to the right of step 110.

From region 113, the molten glass is drawn upwardly into a compartment 118 defined by two L-shaped pieces 119 and 120. Each of the pieces 119 and 120 is connected by means of a respective inclined wall 121 to a respective vertical wall 122 of a glass drawing tower 123. Within tower 123 are disposed a plurality of pairs of forming rollers 124 only the lower pair of which is visible.

Compartment 118 is provided with coolers 125 for cooling the opposite surfaces of the glass strip 126 in the region near the foot 127 of this strip. Compartment 118 is further provided with small marginal rollers 128 which are disposed slightly above the foot 127 for preventing the strip 126 from shrinking excessively while it is being formed.

At the lower end of tower 123, there are provided two inwardly directed ledges 129 between which the glass strip 126 passes.

The horizontal arm of L-shaped piece 119 is positioned at an appropriate level for shielding the portion of bath 108 therebelow from the action of the right-hand cooler 125 so as to prevent this portion of bath 108 from being solidified. This horizontal arm is provided with a boron nitride tip 130 for preventing the molten glass from adhering to the tip in the event that such molten glass is insufficiently cooled and is thus permitted to flow into contact with the tip.

Electric resistance heaters 131 are disposed in ducts 132 immersed in the bath 108. The heaters 131 are arranged to provide sufficient heat to prevent the material of bath 108 from solidifying in the region below the foot 127. Only the right-hand portion 133 of bath 108 is permitted to solidify.

For carrying out the various ion diffusion and migration treatments according to the present invention, there are provided an upper electrode 134 attached to the bottom surface of the horizontal leg of L-shaped piece 120, and two lower electrodes 135 which pass through sole 109 and extend into bath 108. For this purpose there is also provided a tube 136 extending through lid member 116 and having an outlet end which opens into the space 137 extending between electrode 134 and the surface of glass layer 111. Tube 136 is provided for conveying ions and for discharging them into the space 137 where they will be subjected to the action of the electric field formed between electrodes 134 and 135 when they are connected to a suitable potential source, such as that shown in FIGURE 2 for example.

As in the other illustrated embodiments, the glass treating arrangement shown in FIGURE 6 is capable of subjecting glass layer 111 to all of the ion diffusion and/or migration processes described above.

What is claimed is:

1. A method for treating glass in the liquid state which comprises:
    (a) feeding a layer of liquid glass to a sheet-forming area by floating the layer on a mass of molten metal or molten metallic salt having a higher density than the liquid glass so that one surface of said layer is in contact with the molten mass and the opposite surface of said layer is in contact with a gaseous atmosphere;
    (b) providing an electric field which extends between the gaseous atmosphere and the molten mass, passing through the layer of liquid glass; and
    (c) effecting controlled diffusion of at least one type of ion in, into, out of or away from at least one surface region of said layer of liquid glass; which layer contains exchangeable ions; said controlled diffusion consisting essentially of (1) maintaining the electric field such that the polarity of the molten mass is positive with respect to the gaseous atmosphere and diffusion is controlled from said molten mass into the liquid glass and/or from the surface of the layer of liquid glass in contact with the molten mass into the interior of said layer of liquid glass or (2) maintaining the electric field such that the porality of the molten mass is negative with respect to the gaseous atmosphere, decreasing diffusion from the molten mass into the layer of liquid glass, increasing diffusion from the gaseous atmosphere into the layer of liquid glass and/or producing migration from the surface of the layer of liquid glass in contact with the gaseous atmosphere into the interior of said layer of liquid glass.

2. A method as defined in claim 1 wherein at least some of the ions which are caused to diffuse into said liquid glass layer are of a type which modifies at least one of the chemical, mechanical, or optical properties of glass formed from said layer.

3. A method as defined in claim 1 comprising the further step of introducing ions into a portion of said atmosphere which is traversed by said electric field during a period when said layer is being fed to such forming area and is being traversed by said field.

4. A method as defined in claim 1 wherein said step of providing an electric field is carried out by creating a field of a predetermined intensity and direction, and wherein the composition of said molten mass is suitably chosen with respect to that of said glass layer for causing an electric field having such predetermined intensity and direction to create a diffusion of metal ions from said layer into said mass.

5. A method as defined in claim 1 wherein said step of providing an electric field is carried out by providing at least two electric fields each of which extends between said atmosphere and said molten mass and each of which traverses a different region of said glass layer.

6. A method as defined in claim 1 comprising the further step of drawing said glass layer into a glass sheet in said forming area.

7. A method according to claim 1 wherein at least one of (a) the molten mass of material and (b) the gaseous atmosphere contains ions selected from the group consisting of lithium ions, potassium ions, calcium ions, barium ions, magnesium ions, lead ions, tin ions, iron ions, manganese ions, cobalt ions, nickel ions, selenium ions and copper ions and the electric field is applied in a direction and of an intensity to effect beneficial control of said ions with respect to said layer of liquid glass.

8. Apparatus for the manufacture of sheet glass comprising in combination:
    (a) a sheet glass forming unit;
    (b) means for maintaining a bath of molten material of a density greater than that of liquid glass and capable of floating a liquid glass layer to the sheet glass forming unit;
    (c) means for maintaining a gaseous atmosphere in contact with one surface of the liquid glass layer floating on the bath of molten material;
    (d) means for maintaining the liquid glass layer in movement on said bath of molten material toward said sheet glass forming unit; and
    (e) means for applying an electric field between the bath of molten material and the gaseous atmosphere.

9. Apparatus according to claim 8 wherein means (b) and means (c) comprise a vessel provided with means for introducing ions into a region in the gaseous atmosphere above said liquid glass layer, which region is traversed by the electric field.

10. Apparatus as defined in claim 8 wherein said forming unit is constituted by a glass drawing unit.

11. Apparatus as defined in claim 9 wherein said means for dischargeing ions comprises at least one tube having an outlet end which opens into the region above such glass layer traversed by said electric field.

12. Apparatus as defined in claim 8 wherein said means for applying an electric field are constituted by electrodes disposed at different levels in said vessel.

References Cited

UNITED STATES PATENTS

| | | | |
|---|---|---|---|
| 3,218,220 | 11/1965 | Weber | 161—1 |
| 3,337,322 | 8/1967 | Taylor | 65—32 |
| 2,596,515 | 5/1932 | Watkins et al. | 204—30 |
| 3,393,987 | 7/1968 | Plumat | 65—30 |

FOREIGN PATENTS 620,787  8/1962  Belgium.

S. LEON BASHORE, Primary Examiner

J. H. HARMAN, Assistant Examiner

U.S. Cl. X.R.

65—32, 196, 90, 182; 204—280